A. SANFORD.
Chain-Hook.

No. 222,203. Patented Dec. 2, 1879.

Witnesses,
W. H. H. Knight
Gilbert Hart

Inventor,
Albert Sanford
By L. Hill
His Atty.

UNITED STATES PATENT OFFICE.

ALBERT SANFORD, OF OSHKOSH, WISCONSIN.

IMPROVEMENT IN CHAIN-HOOKS.

Specification forming part of Letters Patent No. 222,203, dated December 2, 1879; application filed October 24, 1879.

*To all whom it may concern:*

Be it known that I, ALBERT SANFORD, of Oshkosh, Winnebago county, Wisconsin, have invented a new and Improved Chain-Hook; and I do hereby declare the following to be a full, clear, and exact description of the same, reference being had to the accompanying drawings, forming part of this specification, in which—

Figure 1:
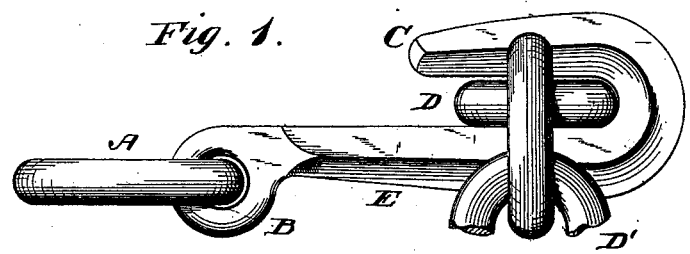
Figure 2:
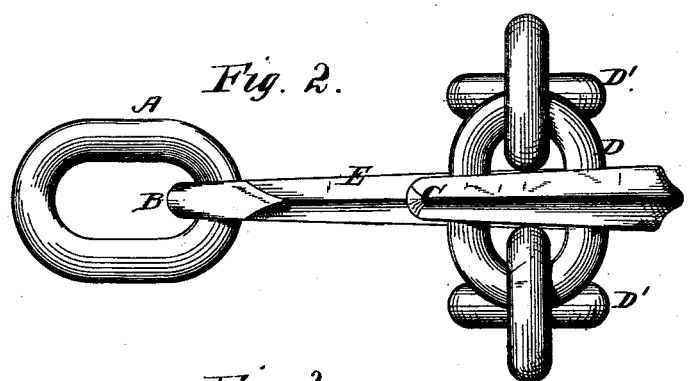
Figure 3:
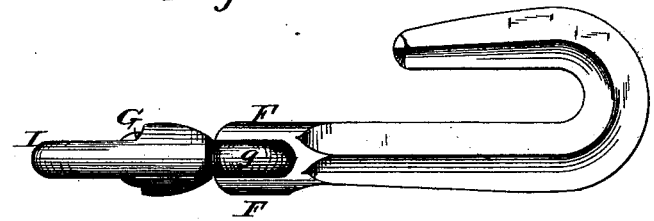
Figure 4:
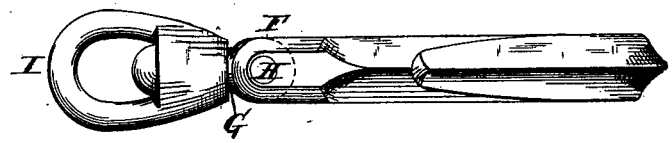
Figure 5:
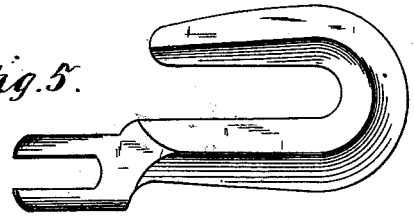

Figures 1 and 2 represent side and top views, respectively, of a chain-hook of the ordinary construction. Figs. 3 and 4 represent side and top views, respectively, of a hook constructed in accordance with my invention; and Fig. 5 represents a view of a modification of my improved hook.

Similar letters of reference in the several figures denote the same parts.

To this end the invention consists, primarily, of a hook formed with lugs or ears at the end of its shank, in combination with a connecting-bar pivoted between said lugs or ears on a pin or axis coincident with a line drawn longitudinally through the shank and point of the hook, whereby the shank of the hook is enabled to be made shorter and materially strengthened, and a lateral movement allowed to the connecting-bar without obstructing the entrance of the chain to the bite of the hook.

It further consists in the combination, with the hook and the connecting-bar, of a swiveled link swiveled to the connecting-bar, substantially as I will hereinafter more fully set forth.

In the construction of the ordinary chain-hook, (shown in Figs. 1 and 2,) the shank must be made comparatively long in order that sufficient space be left between the link A that passes through the eye B, and the point C of the hook, to enable the link D of the chain to pass into the bite of the hook. In consequence of this length of shank great leverage is exerted on the point C, and, in fact, also upon the shank E, causing frequent bending and breakage of these parts. Should it be attempted to shorten the shank the link A would come so close to the point C as to obstruct the passage of the chain into the bite of the hook, the links D′ D′ on opposite sides of the entering-link D being wider than the distance between A and C.

In my improved hook, (shown in Figs. 3 and 4,) I obviate these defects in the old hook by forming the shank with lugs or ears F F, and combining therewith a connecting-bar, G, having a head or eye which fits between said ears or lugs, and is confined by a pivot-bolt, H. The head *g* of the connecting-bar does not project laterally beyond the sides of the shank, and consequently the shank can be made much shorter without liability of the links of the chain corresponding to the links D′ D′ in Fig. 1 coming in contact with said head, as they do with the link A when the shank of the old hook is shortened. The shorter the shank is the less strain it is subjected to, and there is less danger of bending or breaking the hook. The importance of my improvement in this respect will be obvious. The connecting-bar G may be provided with an eye on its outer end and connected to the end link of a chain, if desired; but I prefer to swivel to it a link, I, as shown, whereby the strain on the said connecting-bar is reduced and the chain prevented from twisting and buckling, as is the case when the ordinary hook is employed.

In Fig. 5 I have shown a modified form of hook which may be employed instead of that shown in Figs. 3 and 4, if desired.

The complete hook can be cheaply made, and its use will effect a great saving in both chains and hooks.

I claim as my invention—

1. The short-shanked hook formed with lugs or ears at the end of its shank, in combination with the connecting-bar pivoted between said lugs or ears on a pin or axis coincident with a line drawn longitudinally through the shank and pivot of the hook, substantially as described, for the purpose specified.

2. The combination of the hook, the connecting-bar, and the link swiveled to the connecting-bar, substantially as described.

ALBERT SANFORD.

Witnesses:
W. BLACKSTOCK,
C. M. CHURCH.